(12) United States Patent
Nellore et al.

(10) Patent No.: US 11,974,209 B2
(45) Date of Patent: Apr. 30, 2024

(54) WI-FI HOME NETWORK CONTROLLER STEERING USING FTM REQUESTS

(71) Applicant: ARRIS Enterprises LLC, Suwanee, GA (US)

(72) Inventors: Anil Kumar Nellore, Bangalore (IN); Jeyakumar Barathan, Bangalore (IN); Ravikumar Rajashekhar Patil, Bangalore (IN); Chandra Shekar Ksheerasagar, Bangalore (IN); Swaroop Mahadeva, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 193 days.

(21) Appl. No.: 17/532,279

(22) Filed: Nov. 22, 2021

(65) Prior Publication Data

US 2022/0174578 A1 Jun. 2, 2022

Related U.S. Application Data

(60) Provisional application No. 63/118,816, filed on Nov. 27, 2020.

(51) Int. Cl.
*H04W 40/20* (2009.01)
*H04B 7/155* (2006.01)
(Continued)

(52) U.S. Cl.
CPC ........ *H04W 40/20* (2013.01); *H04B 7/15507* (2013.01); *H04W 4/023* (2013.01);
(Continued)

(58) Field of Classification Search
CPC ..... H04W 40/20; H04W 4/023; H04W 24/08; H04W 84/12; H04W 88/16; H04W 48/20; H04B 7/15507
(Continued)

(56) References Cited

U.S. PATENT DOCUMENTS

2018/0176284 A1* 6/2018 Strater ................. H04B 17/318
2018/0288664 A1* 10/2018 Ouzieli ................. H04W 36/08
(Continued)

OTHER PUBLICATIONS

International Search Report and the Written Opinion of the international Searching Authority dated Mar. 16, 2022 in International (PCT) Application No. PCT/US2021/060287.
(Continued)

*Primary Examiner* — Ricardo H Castaneyra
*Assistant Examiner* — Syed M Bokhari
(74) *Attorney, Agent, or Firm* — Wenderoth, Lind & Ponack, L.L.P.

(57) ABSTRACT

An apparatus, method, and computer-readable recording medium perform client access point assignment of a network device in a wireless network. The wireless network is configured to communicatively interconnect the gateway device, one or more wireless extenders, and one or more client devices. The gateway device includes a network controller, a non-transitory memory storing a program, and a communication interface configured to establish communication connections with the one or more client devices and the one or more wireless extenders via the wireless network. The network steers for a first client device, transmits a distance query to each of the one or more wireless extenders regarding the first client, receives distance responses from each of the one or more wireless extenders regarding the first client, and prepares a candidate steering list for the first client.

15 Claims, 4 Drawing Sheets

(51) Int. Cl.
*H04W 4/02* (2018.01)
*H04W 24/08* (2009.01)
*H04W 84/12* (2009.01)
*H04W 88/16* (2009.01)

(52) U.S. Cl.
CPC ............ *H04W 24/08* (2013.01); *H04W 84/12* (2013.01); *H04W 88/16* (2013.01)

(58) Field of Classification Search
USPC ....................................................... 370/252
See application file for complete search history.

(56) References Cited

U.S. PATENT DOCUMENTS

| | | |
|---|---|---|
| 2019/0116627 A1 | 4/2019 | Min et al. |
| 2021/0083980 A1* | 3/2021 | Van Den Brink .... H04L 47/263 |
| 2022/0078644 A1* | 3/2022 | Chennichetty ........ H04W 24/08 |

OTHER PUBLICATIONS

International Preliminary Report on Patentability and Written Opinion dated Jun. 8, 2023 in International Application No. PCT/US2021/060287.
"Fine Timing Measurements (FTM)" Intel Corporation, Agenda item S.2, R2-153878, 3GPP TSG-RAN2 Meeting #91, Beijing, P.R. China, Aug. 24-28, 2015, 2 pages.

\* cited by examiner

WI-FI HOME NETWORK CONTROLLER STEERING USING FTM REQUESTS

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device for the control and management of devices in the wireless network to improve the quality of experience (QoE) for users. To increase coverage and to enhance roaming of client devices, a Home Network Controller (HNC) typically uses spell out BSSID (BSSID) Transition Management (BTM) steering capability on clients to allow a fast transition of the client device from one access point (AP) to another AP. BSS transition, and thus BTM steering, is achieved by sending BSS transition management frames by the AP to the client device. The location of a client device relative to available APs on the wireless network is obtained and used to make these steering decisions.

Typically, an AP uses one of two approaches to determine an appropriate AP for use when steering the client device during these transitions from one AP to another AP. First, an HNC may collect a non-associated (NA) station report regarding all of the AP devices on a wireless network. This approach requires a significant amount of network overhead and may lead to network performance degradation. Additionally, the HNC may not receive all of the NA station reports in a timely manner to make a station steering decision when steering is imminent.

A second approach requires the HNC to collect a NA station report on an as needed basis. In this approach, the HNC instructs all of the AP devices to collect an NA report on a client device when the HNC is deciding to steer a particular client device. The HNC waits a short period of time, for example 1-5 seconds, to see if an NA report becomes available. Because all client devices are not likely to respond to such a request from the AP devices that are used to generate the NA station reports in this short period of time, the HNC may be making a steering decision without adequate data. As such, the excessive network overhead associated with the prior approach may be reduced; however, the timeliness of the availability of the NA station reports for use in steering decisions is adversely affected.

Thus, it would be advantageous and an improvement over the relevant technology to provide optimized client device location determination for use in steering decisions within a wireless network by using the closest AP device to a particular client device when a steering operation is initiated. This distance measurement may be obtained using a Wi-Fi Fine Time measurement (FTM) Round Trip Time (RTT) that is available from the issuance of an FTM request.

SUMMARY

An aspect of the present disclosure provides a gateway device for client device location determination for use in steering decisions in a wireless network. The wireless network is configured to communicatively interconnect the gateway device, one or more wireless extenders, and one or more client devices. In this aspect of the present disclosure, the gateway device includes a network controller, a non-transitory memory storing a program, and a communication interface configured to establish communication connections with the one or more client devices and the one or more wireless extenders via the wireless network.

The network controller is configured to execute the program to initiate client steering for a first client device, transmit a distance query to each of the one or more wireless extenders regarding the first client, receive distance responses from each of the one or more wireless extenders regarding the first client, and prepare a candidate steering list for the first client.

In another aspect of the present disclosure, the extender devices transmit an FTM request to the client device and receive a client FTM response used to generate the distance response sent to the gateway device.

In another aspect of the present disclosure, the processor is further configured to execute the instructions on the memory to cause the gateway device to select a Wi-Fi extender device closest to the client device from the candidate steering list and transmit a steering assignment to the client device causing the client device to connect to the closest extender device.

In another aspect of the present disclosure, the gateway device further comprises an HNC agent for communicating with the client device.

In another aspect of the present disclosure, the HNC agent transmits an FTM request and receives an FTM response with the client device and the HNC agent submits its FTM response to the HNC controller for inclusion on the candidate steering list.

In another aspect of the present disclosure, the HNC controller requests distance measurements between the Wi-Fi extenders and the client device on an as needed basis.

An aspect of the present disclosure provides a method for client-optimized onboarding in a wireless network. The wireless network is configured to communicatively interconnect a gateway device, one or more wireless extenders, and one or more client devices. The method includes initiating client steering for a first client device, transmitting a distance query to each of the one or more wireless extenders regarding the first client, transmitting an FTM Request to the first client, receiving distance responses from each of the one or more wireless extenders regarding the first client, receiving an FTM response from the first client, and preparing a candidate steering list for the first client.

In another aspect of the present invention, the method further selects a Wi-Fi extender device closest to the client device from the candidate steering list and transmits a steering assignment to the client device causing the client device to connect to the closest extender device.

An aspect of the present disclosure provides a non-transitory computer-readable recording medium in a gateway device for client-optimized onboarding in a wireless network. The wireless network is configured to communicatively interconnect the gateway device, one or more wireless extenders, and one or more client devices and the non-transitory computer-readable recording medium stores one or more programs, which when executed by a network controller of the gateway device, performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustrative purposes only, and not for the purpose of limiting the present disclosure as defined by the appended claims and their equivalents.

Figure 1:
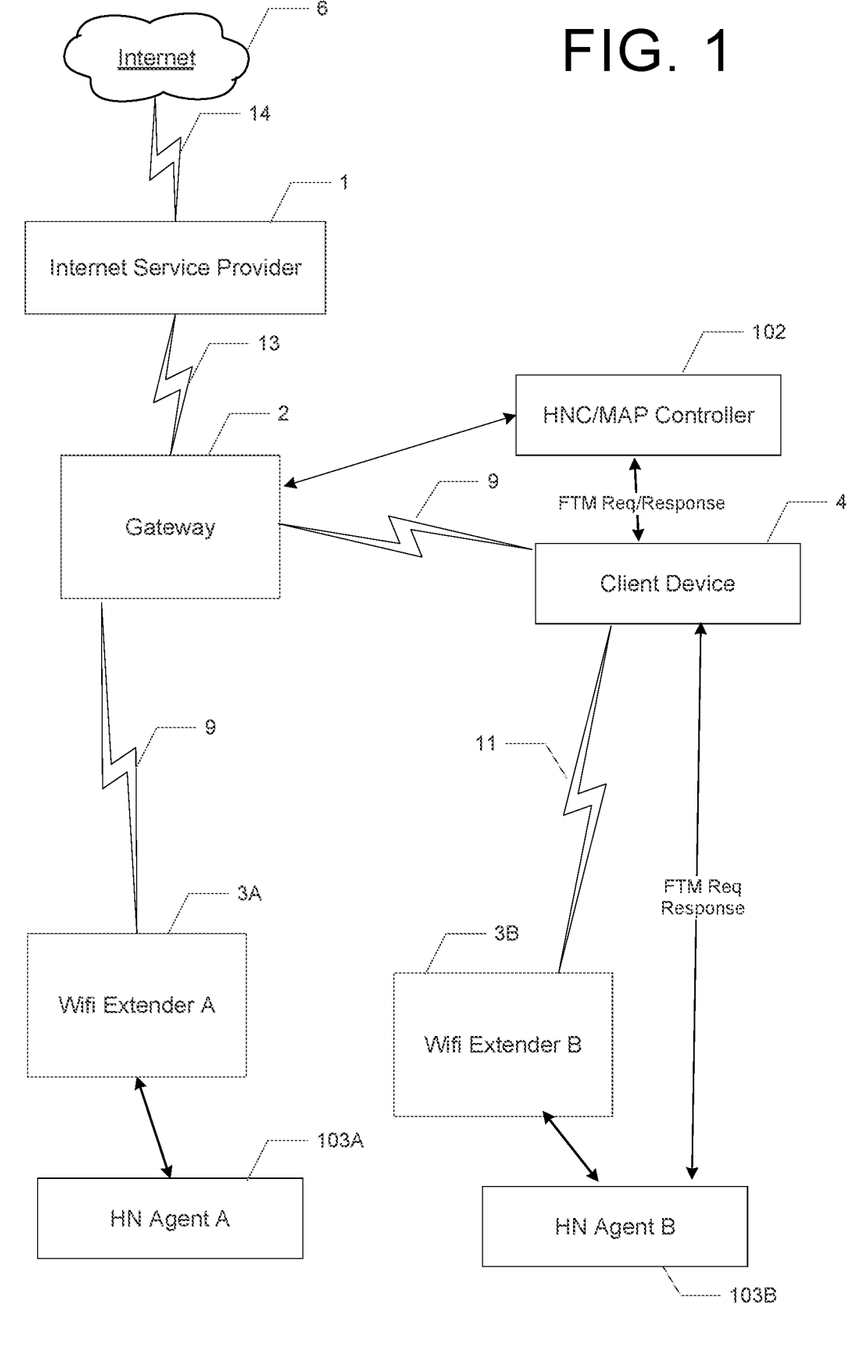
FIG. 1 is a schematic diagram of a system according to an embodiment of the present disclosure.

FIG. 1 is a schematic diagram of a system according to an embodiment of the present disclosure. As shown in FIG. 1, the main elements of the system include a gateway device 2 connected to the Internet 6 via an Internet Service Provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network, or a 2G, 3G, 4G or 5G network, for example.

The connection 13 can further include as some portion thereof a broadband network connection, an optical network connection or other similar connections. For example, the connection 13 also can be implemented using a fixed wireless connection that operates in accordance with, but is not limited to, 3rd Generation Partnership Project (3GPP), Long Term Evolution (LTE) or 5G protocols.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content and playing over-the-top (OTT)—or multiple system operator (MSO)—provided content.

The connection 9 between the gateway device 2, the wireless extenders 3, and client devices 4 can be implemented using a wireless connection in accordance with any IEEE 802.11 Wi-Fi, Bluetooth, Bluetooth Low Energy (BLE) or other short range protocols that operate in accordance with wireless technology standard for exchanging data over short distances using any licensed or unlicensed band such as the citizens broadband radio service (CBRS) band, 2.4 GHz bands, 5 GHz bands or 6 GHz bands. Additionally, the connection 9 can be implemented using a wireless connection that operates in accordance with, but is not limited to, RF4CE, ZigBee, Z-Wave or IEEE 802.15.4 protocols. It also is contemplated by the present disclosure that the connection 9 can include connections to a media over coax (MoCA) network. One or more of the connections 9 can also be a wired Ethernet connection. An HNC controller 102 executes within a gateway device 2 to perform the network control operations for the wireless network.

The wireless extenders 3A-3B can be, for example, hardware electronic devices such as access points used to extend the wireless network by receiving the signals transmitted by the gateway device 2 and rebroadcasting the signals to, for example, client devices 4 which may out of range of the gateway device 2. The wireless extenders 3A-3B also can receive signals from the client devices 4 and rebroadcast the signals to the gateway device 2 or other client devices 4. A Home Network (HN) Agent 103a-103B executes within its corresponding wireless extenders 3A-3B to perform the operations of the wireless extenders 3A-3B.

The connections 11 between the wireless extenders 3A-3B and the client devices 4 are implemented through a wireless connection that operates in accordance with any IEEE 802.11 Wi-Fi, Bluetooth, Bluetooth Low Energy (BLE) or other short range protocols that operate in accordance with a wireless technology standard for exchanging data over short distances using any licensed or unlicensed band such as the CBRS band, 2.4 GHz bands, 5 GHz bands or 6 GHz bands. Additionally, the connection 11 can be implemented using a wireless connection that operates in accordance with, but is not limited to, RF4CE, ZigBee, Z-Wave or IEEE 802.15.4 protocols. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a TV, an IP/QAM STB or an SMD that is capable of decoding audio/video content, and playing over OTT- or MSO-provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 also can be implemented, for example, through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network.

The connection 10 also can be implemented using a wireless connection in accordance with Bluetooth, Bluetooth Low Energy (BLE) or other short range protocols that operate in accordance with a wireless technology standard for exchanging data over short distances using any licensed or unlicensed band such as the CBRS band, 2.4 GHz bands, 5 GHz bands or 6 GHz bands. One or more of the connections 10 also can be a wired Ethernet connection.

Figure 2:
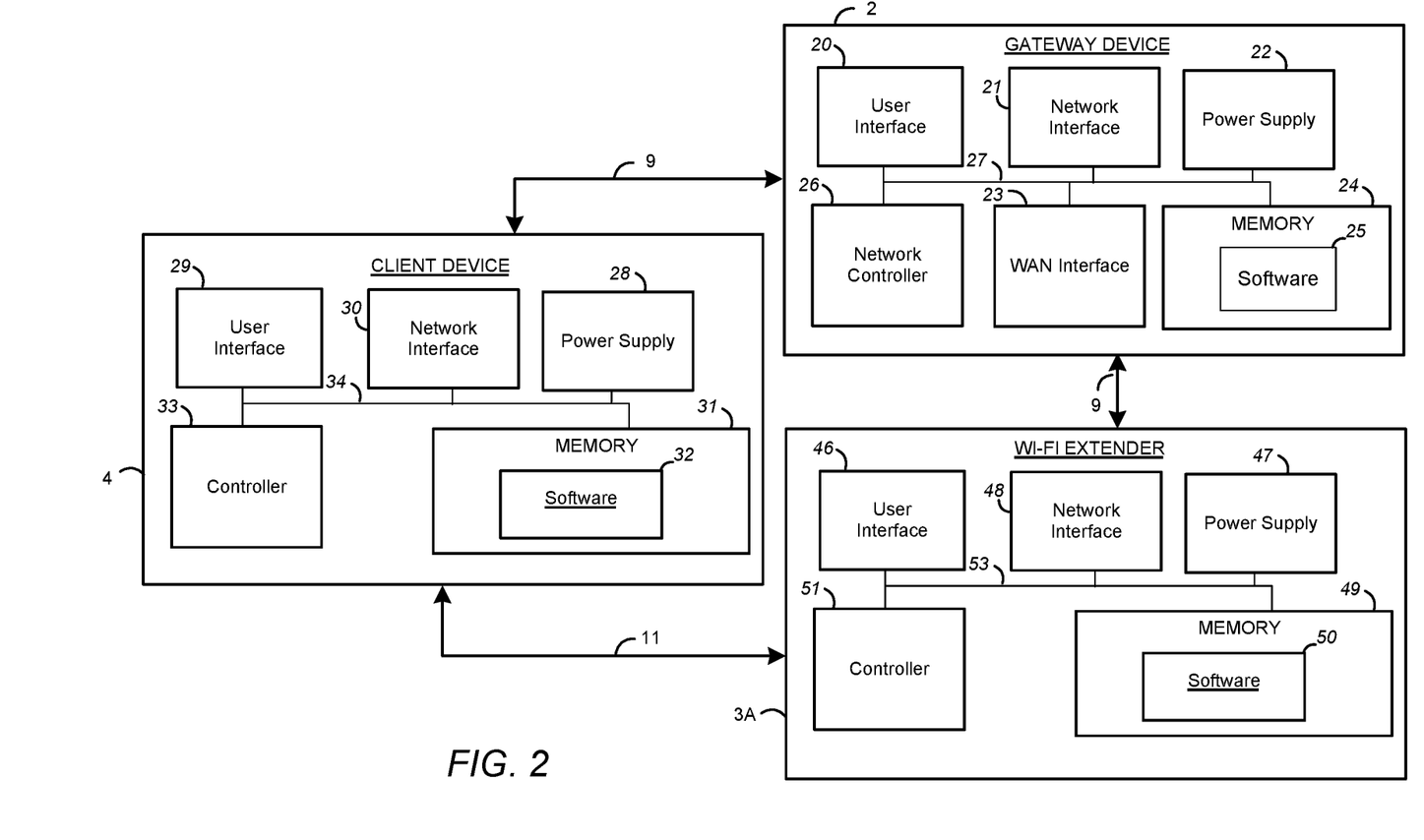
FIG. 2 is a more detailed schematic diagram of an exemplary gateway device, client device, and wireless extender implemented in the system of FIG. 1 according to an embodiment of the present disclosure.

A detailed description of the exemplary internal components of the gateway device 2, the wireless extenders 3A-3B, and the client devices 4 shown in FIG. 1 will be provided in the discussion of FIG. 2. However, in general, it is contemplated by the present disclosure that the gateway device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all or some of the computing components in the gateway device 2, the wireless extenders 3A-3B, and the client devices 4 may be adapted to execute on any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3A-3B, and the client devices 4 are further equipped with components to facilitate communications with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3A, and an exemplary client device 4 implemented in the system of FIG. 1 according to an embodiment of the present disclosure. Although FIG. 2 only shows one wireless extender 3A and one client device 4, the wireless extender 3A and the client device 4 shown in the figure are meant to be representative of the other wireless extenders 3A-3B and client devices 4 shown in FIG. 1. Similarly, the connections 9 between the gateway device 2, the wireless extender 3A, and the client device 4 shown in FIG. 2 are meant to be exemplary connections and are not meant to indicate all possible connections between the gateway devices 2, wireless extenders 3A-3B, and client devices. Additionally, it is contemplated by the present disclosure that the number of gateway devices 2, wireless extenders 3A-3B, and client devices 4 is not limited to the number of gateway devices 2, wireless extenders 3A-3B, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT- or MSO-provided content received through the gateway device 2.

As shown in FIG. 2, the client device 4 includes a power supply 28, user interface 29, network interface 30, a memory 31, and a controller 33. The power supply 28 provides power to the internal components of the client device 4 through the internal bus 34. The power supply 28 can be a self-contained power source such as a battery pack with an interface to be powered through an electrical charger connected to an outlet (e.g., either directly or by way of another device). The power supply 28 also can include a rechargeable battery that can be detached allowing for replacement such as a nickel-cadmium (NiCd), nickel metal hydride (NiMH), lithium-ion (Li-ion), or lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3A using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the client device 4 in accordance with the embodiments described in the present disclosure (e.g., including the optimized onboarding of client devices according to the embodiments of the present disclosure).

The controller 33, which includes the HNC 102 shown in FIG. 1, controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP) or other similar processing device capable of executing any type of instructions, algorithms or software for controlling the operation and functions of the client device 4 in accordance with the embodiments described in the present disclosure. Communications between the components (e.g., 28-31 and 33) of the client device 4 may be established using an internal bus 34.

The wireless extender 3A can be, for example, a hardware electronic device such as an access point used to extend a wireless network by receiving the signals transmitted by the gateway device 2 and rebroadcasting the signals to client devices 4, which may be out of range of the gateway device 2. The wireless extender 3A also can receive signals from the client devices 4 and rebroadcast the signals to the gateway device 2, mobile device 5, or other client devices 4.

As shown in FIG. 2, the wireless extender 3A includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 also can include a rechargeable battery that can be detached allowing for replacement such as a NiCd, a NiMH, a Li-ion, or a Li-pol battery.

The network interface 48 can include various network cards, interfaces, and circuitry implemented in software and/or hardware to enable communications with the client device 4 and the gateway device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender 3A in accordance with the embodiments described in the present disclosure (e.g., including optimized onboarding of client devices according to the embodiments of the present disclosure).

The controller 51, which includes the HN Agent A 103A in FIG. 1, controls the general operations of the wireless extender 3A and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms or software for controlling the operation and functions of the wireless extender 3A in accordance with the embodiments described in the present disclosure. General communications between the components (e.g., 46-49 and 51) of the wireless extender 3A may be established using the internal bus 53.

The gateway device 2 can be, for example, a hardware electronic device that can combine the functions of a modem, an access point, and/or a router for providing content received from an Internet-based content provider to network devices (e.g., wireless extenders 3A and client devices 4) in the system. It also is contemplated by the present disclosure that the gateway device 2 can include the function of, but is not limited to, an IP/QAM STB or SMD that is capable of decoding audio/video content, and playing OTT- or MSO-provided content.

As shown in FIG. 2, the gateway device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards and circuitry implemented in software and/or hardware to enable communications with the wireless extender 3A and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance with connection 10 (e.g., as described with reference to FIG. 1).

The power supply 22 provides power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 also can include a rechargeable battery that can be detached allowing for replacement such as a NiCd, a NiMH, a Li-ion, or a Li-pol battery. The WAN interface 23 may include various network cards, and circuitry implemented in software and/or hardware to enable communications between the gateway device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, a hard disk or any other various layers of memory hierarchy. The memory 24 can be used to store any type of instructions, software or algorithm including software 25 for controlling the general functions and operations of the gateway device 2 and performing management functions related to the other devices (wireless extenders 3A-3B and client device 4) in the network in accordance with the embodiments described in the present disclosure (e.g., including optimized onboarding of client devices according to the embodiments of the present disclosure).

The network controller 26 controls the general operations of the gateway device 2 as well as performs management functions related to the other devices (wireless extenders 3A-3B and client device 4) in the network. The network controller can include, but is not limited to, a CPU, a hardware microprocessor, a hardware processor, a multi-core processor, a single core processor, a FPGA, a micro-controller, an ASIC, a DSP or other similar processing device capable of executing any type of instructions, algorithms or software for controlling the operation and functions of the gateway device 2 in accordance with the embodiments described in the present disclosure. Communications between the components (e.g., 20-22, 24, and 26) of the gateway device 2 may be established using the internal bus 27.

Figure 3:
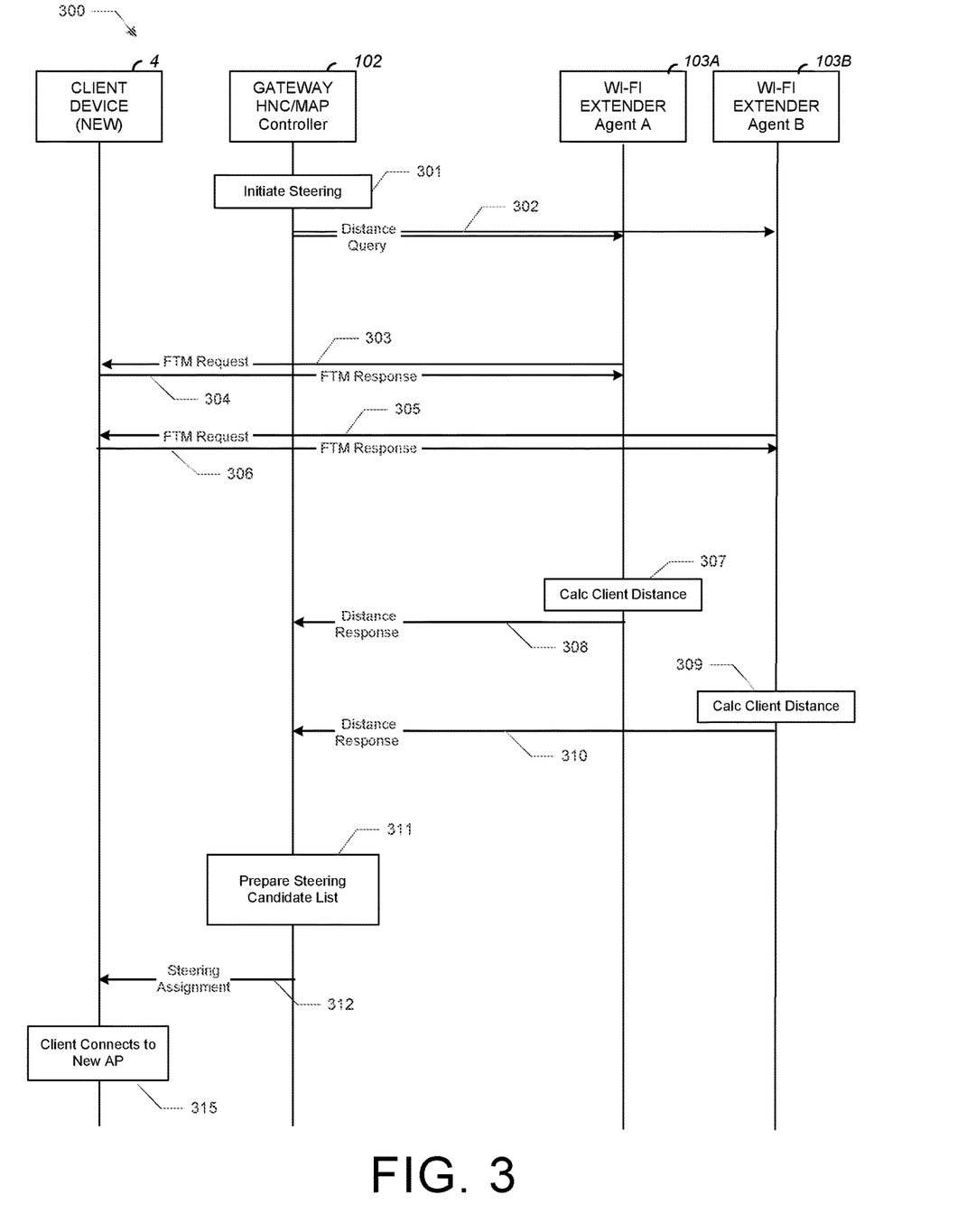
FIG. 3 illustrates a method and algorithm for performing client device location determination for use in steering decisions in a wireless network according to an embodiment of the present disclosure.

FIG. 3 illustrates a method and algorithm for performing client device location determination for use in steering decisions in a wireless network according to an embodiment of the present disclosure. In FIG. 3, it is assumed that the new client device (e.g., client device 4), the gateway device 2, the Wi-Fi extender A (e.g., wireless extender 103A), and Wi-Fi extender B (wireless extender 3B) include their respective software 25, 32, 50 stored in their respective memories 24, 31, 49, which, when executed by their respective controllers 26, 33, 51, perform the functions and operations in accordance with the embodiments described in the present disclosure (e.g., including performing client device location determination for use in steering decisions in a wireless network according to the embodiments of the present disclosure).

Although FIG. 3 shows one gateway device 2, one client device 4 (e.g., new client device), and two wireless extenders 3A-B (e.g., Wi-Fi extender A and Wi-Fi extender B), it is contemplated by the present disclosure that the method and algorithm 300 can be applied to any number of gateway devices 2, client devices 4, and wireless extenders 3A-3B for providing optimized onboarding of devices to any number of wireless networks in the system of FIG. 1.

In step 301, the gateway HNC controller 102 initiates client device steering and transmits a distance query 302 to the Wi-Fi-extender agents 103a-103b in step 302. The Wi-Fi extender agents 103A-103B then contact the client device 4 to determine its location relative to each of the Wi-Fi extenders 3A-3B

Wi-Fi extender agent A 103A transmits an FTM request in step 303 and the client device 4 responds with an FTM response 304. Wi-Fi extender agent B 103B transmits an FTM request in step 305 and the client device 4 responds with an FTM response 306. Using these responses, Wi-Fi extender agent A 103A calculates a client distance for the client device 4 in step 307. Wi-Fi extender agent B 103B calculates its client distance from the client device 4 in step 309 using the FTM response from the client device 4.

In step 308, Wi-Fi extender agent A 103A transmits its client distance from the client device 4 to the HNC controller 102. Similarly, Wi-Fi extender agent B 103B transmits its client distance from the client device 4 to the HNC controller 102 in step 310. The HNC controller prepares a steering candidate list in step 311 using the distance responses received from the Wi-Fi extender agents 103A-103B.

The HNC controller 102 transmits a steering assignment in step 312 informing the client device 4 the AP the client device 4 is to use. The client device 4 concludes the steering process 300 by connecting to the assigned AP in step 315.

Figure 4:
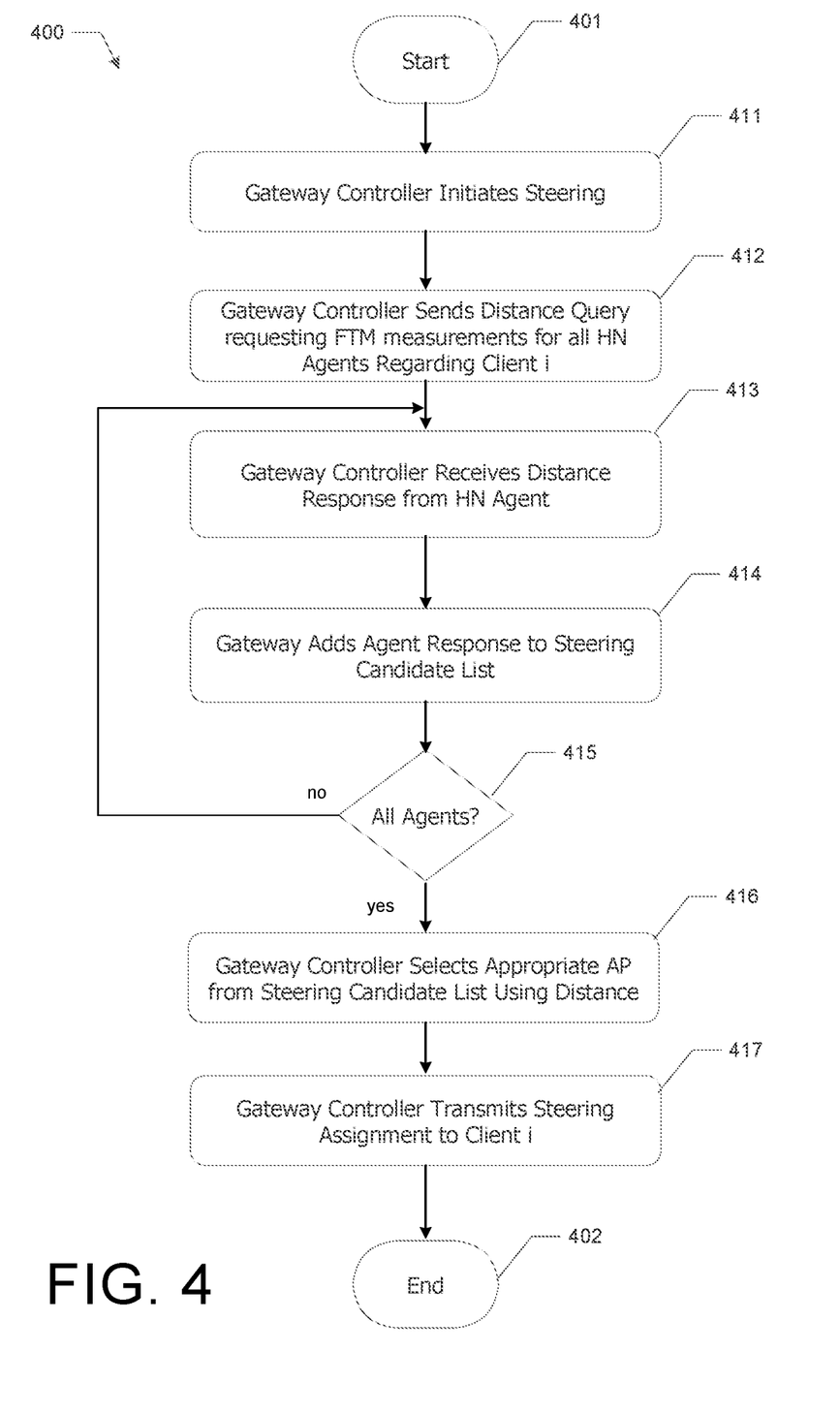
FIG. 4 illustrates a method and algorithm for performing client device location determination for use in steering decisions in a wireless network according to an embodiment of the present disclosure.

FIG. 4 illustrates a method and algorithm for performing client device location determination for use in steering decisions in a wireless network according to an embodiment of the present disclosure. The exemplary method and algorithm of FIG. 4 illustrate the action taken by the gateway device 2 when there is a steering decision to be made regarding a client device from a network device (e.g., gateway device 2 or wireless extender 3) to another access point. In FIG. 4 it is assumed that the client device 4, the gateway device 2, and each of the wireless extenders 3 include their respective software 25, 32, 50 stored in their respective memories 24, 31, 49 which, when executed by their respective controllers 26, 33, 51, perform the functions and operations in accordance with the embodiments described in the present disclosure (e.g., including optimized onboarding of client devices according to the embodiments of the present disclosure).

The process 400 begins 401 when an HNC controller 102 in a gateway device 2 initiates client device steering in step 411. Next in step 412, the HNC controller 102 sends a distance query requesting that Wi-Fi extender agents 103A-103B obtain FTM measurements between these Wi-Fi-extenders 3A-3B and the client device 4. The Wi-Fi extender agents 103A-103B send these FTM requests to the client device 4 and receive the corresponding FTM responses.

In step 413 the HNC controller 102 receives a distance response from a Wi-Fi-extender agent 103A-103B that includes the FTM response received by that particular Wi-Fi extender agent 103A-103B from the client device. The HNC 102 adds the received response from the particular Wi-Fi extender agent 103A-103A to a steering candidate list in step 414.

In test step 415 the HNC controller 102 determines if all of the particular Wi-Fi extender agents 103A-103B have responded, and if not, the process 400 returns to step 413 to obtain the remaining responses from the remaining Wi-Fi extender agents 103A-103B. When the HNC controller 102 determines that all of the agent responses have been received, the HNC controller uses the steering candidate list to assign the client device 4 to the appropriate Wi-Fi extender 103A-103B using the FTM measurements described above. The process 400 ends 402 when the HNC controller 102 transmits a steering assignment to the client device 4 and the client device 4 connects to the assigned network device.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), large scale integrated circuit (LSI), system LSI, super LSI, or ultra LSI components that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories store software or algorithms with executable instructions and the one or more processors can execute a set of instructions of the software or algorithms in association with providing monitoring and installation enhancements in any number of wireless networks in accordance with the embodiments described in the present disclosure.

The software and computer programs, which can also be referred to as programs, software applications, applications, components, or code, include machine instructions for a programmable processor and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc where disks usually reproduce data magnetically and discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A gateway device for client access point assignment of a network device in a wireless network, the wireless network to communicatively interconnect the gateway device, one or more wireless extenders, and one or more client devices, the gateway device comprising: a memory having instructions stored thereon; and a processor configured to execute the instructions on the memory to cause the gateway device to: initiate client steering for a first client device; transmit a distance query to each of the one or more wireless extenders regarding the first client, wherein the distance query requests that one or more wireless extender agents of the one or more wireless extenders obtain fine time measurements (FTM) between the one or more wireless extenders; receive, in response to the distance query, a distance response from each of the one or more wireless extenders regarding the first client; prepare a candidate steering list for the first client using the distance response from each of the one or more wireless extenders regarding the first client select a Wi-Fi extender device closest to the client device from the candidate steering list; and transmit a steering assignment to the client device that causes the client device to connect to the closest extender device.

2. The gateway device according to claim 1, wherein the HNC controller requests distance measurements between the Wi-Fi extenders and the client device on an as needed basis.

3. The gateway device according to claim 1, wherein the distance response from each of the one or more wireless extenders received by the gateway device is based on a client FTM response received by the one or more extender devices in response to an FTM request transmitted to the client device from the one or more extender devices.

4. The gateway device according to claim 1, wherein the processor is a home network controller (HNC) controller that executes within the gateway device.

5. The gateway device according to claim 1, wherein the distance response includes an FTM response received by each of the one or more wireless extenders.

6. A method for client access point assignment of a network device in a wireless network, the wireless network configured to communicatively interconnect an access point device including a network controller, one or more wireless extenders, and one or more client devices, the method comprising: initiating client steering for a first client device; transmitting a distance query to each of the one or more wireless extenders regarding the first client, wherein the distance query requests that one or more wireless extender agents of the one or more wireless extenders obtain fine time measurements (FTM) between the one or more wireless extenders; receiving, in response to the distance query, a distance response from each of the one or more wireless extenders regarding the first client; receiving an FTM response from the first client; preparing a candidate steering list for the first client, using the distance response from each of the one or more wireless extenders regarding the first client; selecting a Wi-Fi extender device closest to the client device from the candidate steering list; and transmitting a steering assignment to the client device that causes the client device to connect to the closest extender device.

7. The method according to claim 6, wherein the HNC controller requests distance measurements between the Wi-Fi extenders and the client device on an as needed basis.

8. The method according to claim 6, wherein the distance response from each of the one or more wireless extenders received by the gateway device is based on a client FTM response received by the one or more extender devices in response to an FTM request transmitted to the client device from the one or more extender devices.

9. The method according to claim 6, wherein the processor is a home network controller (HNC) controller that executes within the gateway device.

10. The method according to claim 6, wherein the distance response includes an FTM response received by each of the one or more wireless extenders.

11. A non-transitory computer-readable recording medium in an access point device for client access point assignment of a network device in a wireless network, the wireless network configured to communicatively interconnect the access point device, one or more wireless extenders, and one or more client devices, and the non-transitory computer-readable recording medium storing one or more programs which when executed by a network controller of the gateway device performs steps comprising: initiating client steering for a first client device; transmitting a distance query to each of the one or more wireless extenders regarding the first client, wherein the distance query requests that one or more wireless extender agents of the one or more wireless extenders obtain fine time measurements (FTM) between the one or more wireless extenders; receiving, in response to the distance query, a distance response from each of the one or more wireless extenders regarding the first client; receiving an FTM response from the first client; preparing a candidate steering list for the first client using the distance response from each of the one or more wireless extenders regarding the first client; selecting a Wi-Fi extender device closest to the client device from the candidate steering list; and transmitting a steering assignment to the client device that causes the client device to connect to the closest extender device.

12. The computer-readable recording medium according to claim 11, wherein the HNC controller requests distance measurements between the Wi-Fi extenders and the client device on an as needed basis.

13. The computer-readable recording medium according to claim 11, wherein the distance response from each of the one or more wireless extenders received by the gateway device is based on a client FTM response received by the one or more extender devices in response to an FTM request transmitted to the client device from the one or more extender devices.

14. The computer-readable recording medium according to claim 11, wherein the processor is a home network controller (HNC) controller that executes within the gateway device.

15. The computer-readable recording medium according to claim 11, wherein the distance response includes an FTM response received by each of the one or more wireless extenders.

* * * * *